United States Patent [19]

Schmidt et al.

[11] 3,821,241
[45] June 28, 1974

[54] 1-IMIDAZOLYL-2-SUBSTITUTED HYDROXY PROPYL AMINES

[75] Inventors: Paul Schmidt, Therwil; Peter Moser, both of Birsfelden; Guenther Winkmann, Basel, all of Switzerland

[73] Assignee: Ciba-Geigy Corporation, Ardsley, N.Y.

[22] Filed: Feb. 19, 1971

[21] Appl. No.: 117,153

[30] Foreign Application Priority Data
Feb. 26, 1970 Switzerland.......................... 2803/70
June 16, 1970 Switzerland.......................... 9090/70

[52] U.S. Cl................................. 260/309, 424/269

[51] Int. Cl............................................. C07d 49/36
[58] Field of Search.................................. 260/309

*Primary Examiner*—Henry R. Jiles
*Assistant Examiner*—Mildred A. M. Crowder
*Attorney, Agent, or Firm*—Joseph G. Kolodny; Ronald A. Daignault

[57] ABSTRACT

The present invention relates to new amines, particularly 1-imidazolyl-2-hydroxy propyl amines which may be further substituted on the nitrogen atom by aryl or lower alkyl or 1-imidazolyl-2-substituted hydroxy propyl amines, which may be further substituted on the nitrogen atom by aryl or lower alkyl, which are suitable as chemotherapeutics against influenza.

6 Claims, No Drawings

1-IMIDAZOLYL-2-SUBSTITUTED HYDROXY PROPYL AMINES

The invention relates to new amines of formula I

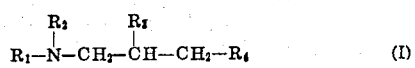

$$R_1-N(R_2)-CH_2-CH(R_3)-CH_2-R_4 \quad (I)$$

wherein $R_1$ represents an optionally substituted aryl radical, $R_2$ represents hydrogen or a lower alkyl radical that is optionally bonded to the aryl radical $R_1$ in the ortho-position but can also be interrupted by a hetero atom, $R_3$ represents a free or substituted hydroxyl group and $R_4$ represents an optionally substituted imidazolyl-(1) radical, as well as processes for their manufacture.

An optionally substituted aryl radical $R_1$ is, for example, a phenyl or naphthyl radical with one, two or more substituents, or above all an unsubstituted phenyl or naphthyl radical, and furthermore, for example, an optionally substituted 5,6,7,8-tetrahydro-1- or -2-naphthyl radical.

Suitable substituents of an aryl radical $R_1$ are, for example, nitro groups, amino groups, such as free amino groups, mono- and di-lower alkylamino groups, acylamino groups and N-acyl-N-lower alkylamino groups, and above all halogen atoms, trifluoromethyl groups, lower alkyl groups and lower alkoxy groups.

Mono- and di-lower alkylamino groups as well as N-acyl-N-lower alkylamino groups are especially those that contain the lower alkyl groups especially mentioned below, above all methyl groups. Such groups are, for example, methylamino, dimethylamino and N-acyl-N-methylamino groups.

Acylamino groups and N-acyl-N-lower alkylamino groups are especially those that contain cycloaliphatic, aromatic, araliphatic and above all aliphatic acyl radicals as acyl radicals.

Aliphatic acyl radicals of formula R—CO— are especially those in which R is a lower alkyl radical. Lower alkyl radicals are, for example, those with at most six C atoms, such as the methyl, ethyl, iso-propyl and n-propyl radical, and straight and branched butyl, pentyl and hexyl radicals bonded in any desired position.

Cycloaliphatic acyl radicals of formula R'—CO— are especially those in which R' denotes an optionally lower-alkylated lower cycloalkyl radical, above all one with 3–7, especially 5–7, ring members, such as for example the cyclopropyl, cyclopentyl, cyclohexyl and cycloheptyl radical.

As aromatic and araliphatic acyl radicals, there may for example be mentioned benzoyl and naphthoyl radicals, or phenyl-lower alkanoyl radicals, such as phenylacetyl, α- and β-phenylpropionyl radicals, respectively.

The acyl radicals mentioned can be substituted yet further.

As substituents for the aromatic and araliphatic acyl radicals — wherein the substituents are preferably located on the rings — there may for example be mentioned: lower alkyl radicals, such as those mentioned above, halogen atoms, such as fluorine, bromine and iodine and especially chlorine, the pseudo-halogentrifluoromethyl and lower alkoxy groups. The substitution may here be single, double or multiple.

Lower alkyl radicals $R_2$ are especially those mentioned above, above all methyl and ethyl.

Lower alkyl radicals that are bonded to the aryl radical $R_1$ in the ortho-position and can also be interrupted by a hetero-atom, especially one of those mentioned below, are for example branched and especially straight-chain lower alkylene radicals that can be interrupted by an oxygen, sulphur or nitrogen atom, such as butylene-(1,3) and -(1,4), pentylene-(1,5), 3-thia-butylene-(1,4) and especially ethylene-(1,2), propylene-(1,3), 3-oxa-butylene-(1,4), 3-aza-butylene-(1,4) and 3-lower alkyl-3-aza-butylene-(1,4), such as 3-methyl-3-aza-butylene-(1,4).

A substituted hydroxyl group $R_3$ is for example an esterified hydroxyl group, such as an acyloxy group, of which the acyl part in particular has the significance given above for acylamino groups, above all a benzoyloxy and acetoxy group.

An optionally substituted imidazolyl-(1) radical $R_4$ is for example a doubly or triply, preferably singly, substituted and especially an unsubstituted imidazolyl-(1) radical. Suitable substituents are, for example, halogen atoms, such as those mentioned above, lower alkoxy groups, such as those mentioned above, amino groups bonded in the 2-position, and lower hydrocarbon radicals.

Amino groups bonded in the 2-position are, for example, mono- and di-lower alkylamino groups, such as those mentioned above, and especially free amino groups.

Lower hydrocarbon radicals are especially those of aliphatic or aromatic character, with radicals of aromatic character being those of which the first C atom is a member of an aromatic system. Radicals of aliphatic character are those of which the first C atom is not a member of an aromatic system.

In the preceding and following text, lower radicals are those with up to six carbon atoms, or with up to 12 carbon atoms in the case of cyclic radicals or radicals with cyclic substituents.

Lower hydrocarbon radicals of aliphatic character are, for example, optionally substituted aliphatic, cycloaliphatic, cycloaliphatic-aliphatic and araliphatic hydrocarbon radicals, such as for example alkyl, alkenyl, cycloalkyl, for example those mentioned above, cycloalkenyl, cycloalkyl-alkyl and -alkenyl, cycloalkenyl-alkyl and -alkenyl, aralkyl and aralkenyl, such as penhyl-lower alkyl and phenyl-lower alkenyl.

Lower cycloalkenyl radicals are, for example, those with 5–7 ring members, such as optionally lower alkylated cyclopentenyl, cyclohexenyl and cycloheptenyl radicals, with the double bond contained in these radicals especially being a $C_1$–$C_2$ double bond.

Lower cycloalkyl-alkyl and -alkenyl radicals as well as cycloalkenyl-alkyl and -alkenyl radicals are especially those wherein the cycloalkyl and cycloalkenyl parts and the alkyl and alkenyl part have the above significance, such as for example cyclopentyl-methyl, 2-cyclohexyl-ethyl, 2-cyclopentyl-vinyl, 2-cyclohexenyl-vinyl, cyclopentylene-1-methyl, 2-cyclohex-1-enyl-ethyl and cyclohepten-1-yl-methyl.

Phenyl-lower alkyl and phenyl-lower alkenyl radicals are, for example, 2-phenylethyl, 3-phenyl-propyl, styryl, cinnamyl and especially benzyl.

Lower hydrocarbon radicals of aromatic character are, for example, phenyl radicals and 1- and 2-naphthyl radicals, which can be substituted as indicated for the aryl radical $R_1$, but are above all unsubstituted.

They are effective against inflenza (virus) infections in warm-blooded animials, for example in subcutaneous administration in doses of 50–200 mg/kg to mice intranasally infected with influenza virus. The new amines of formula I are, therefore, especially suitable in the treatment of influenza. Furthermore, the new amines serve as starting products or intermediate products for the manufacture of other compounds, especially therapeutically active compounds.

Amines of formula II

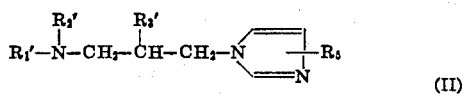

should particularly be highlighted, wherein $R_1'$ represents an unsubstituted phenyl or naphthyl radical or a phenyl or naphthyl radical singly substituted by a lower alkyl or alkoxy radical, a halogen atom or a trifluoromethyl group, $R_2'$ denotes hydrogen or a lower alkyl radical that is optionally interrupted by an oxygen, sulphur or nitrogen atom and bonded to the phenyl or naphthyl radical in the ortho-position, $R_3'$ represents an acylated or above all free hydroxyl group, and $R_5$ represents a halogen atom, a lower alkoxy group, an amino group bonded in the 2-position, or a lower alkyl, alkenyl, cycloalkyl, phenyl-lower alkyl, phenyl-lower alkenyl or phenyl radical or especially hydrogen.

Of these amines, amines of formula III

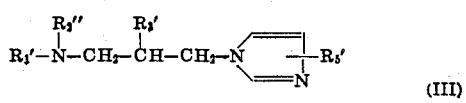

should especially be highlighted, wherein $R_1'$ and $R_3'$ have the above significance, $R_2''$ denotes hydrogen or a lower alkyl radical that is optionally interrupted by an oxygen or nitrogen atom and bonded to the phenyl or naphthyl radical in the ortho-posiiton, and $R_5'$ represents a halogen atom, a lower alkoxy group, a benzyl or phenyl radical, a free, methyl- or dimethyl-amino group bonded in the 2-position, above all a lower alkyl radical and especially hydrogen.

Amines of formula IV

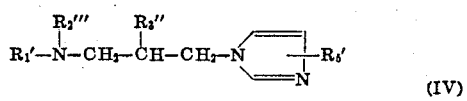

are particularly suitable, wherein $R_1'$ and $R_5'$ have the above significance, $R_3''$ represents a lower alkanoyloxy or benzoyloxy group or especially a hydroxyl group and $R_2'''$ represents hydrogen or especially a lower alkyl radical, and especially 1-(N-methyl-o-methoxy-anilino)-2-hydroxy-3-(1-imidazolyl)-propane, 1-(N-methyl-p-methoxy-anilino)-2-hydroxy-3-(1-imidazolyl)-propane, 1-(N-methyl-p-chloranilino)-2-hydroxy-3-(1-imidazolyl)-propane, 1-(1-indolinyl)-2-hydroxy-3-(1-imidazolyl)-propane, 1-(1-tetrahydroquinolyl)-2-hydroxy-3-(1-imidazolyl)-propane, 1-[1,2,3,5-tetrahydro-4,1-benzoxa-zepinyl-(1)]-2-hydroxy-3-(1imidaxolyl)-propane, 1-(N-methyl-1-naphthylamino)-2-hydroxy-3-(1-imidazolyl-propane, 1-(1-naphthyl-N-methylamino)-2-acetoxy-3-(1-imidazolyl)-propane and above all 1-(N-ethyl-anilino)-2-hydroxy-3-(1-imidazolyl)-propane, which on subcutaneous administration in daily doses of 4 times 50 mg/kg to mice intranasally infected with influenza virus shows an effect against influenza, causing the illness of the mice infected with influenza virus to be more mild and reducing their mortality and, in doing so, being particularly effective in the initial phase (incubation time) of the infection.

The new amines are obtained according to known methods.

Thus it is possible, for example, to react a compound of formula V

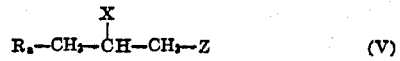

with a compound of formula $R_bH$, wherein one of the radicals $R_a$ and $R_b$ represents the radical of formula

and the other represents $R_4$, with $R_1$, $R_2$ and $R_4$ having the above significance, X represents a free or functionally modified hydroxyl group and Z represents a reactive esterified hydroxyl group, or X and Z together form an epoxy group.

Thus it is possible, for example, to react compounds of formulae VI

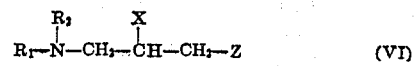

and VII

or compounds of formulae VIII

and IX

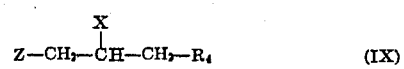

with one another, $R_1$, $R_2$, $R_4$, X and Z having the above significance.

A reactive esterified hydroxyl group is especially a hydroxyl group esterfied by a strong inorganic or organic acid, above all a hydrohalic acid, such as hydrochloric acid, hydrobromic acid or hydriodic acid, also sulphuric acid or a strong organic sulphonic acid, such as a strong aromatic sulphonic acid, such as for example benzenesulphonic acid, p-bromobenzenesulphonic acid or p-toluenesulphonic acid. Thus Z especially represents chlorine, bromine or iodine.

This reaction is carried out in the customary manner. When using a reactive ester as the starting material, the process is preferably carried out in the presence of a basic condensation agent and/or with an excess of the imidazole $HR_4$(VII) or of the amine of formula VIII.

It is furthermore possible, in a compound of formula X

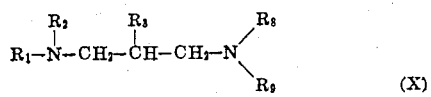

wherein $R_1$, $R_2$ and $R_3$ have the above significance and the group of formula

is a group that can be converted into an imidazolyl-(1) radical $R_4$, to convert the group

into an imidazolyl-(1) radical.

A suitable group of formula

is for example one wherein $R_8$ represents hydrogen and $R_9$ represents an iminomethyl radical. Here the iminomethyl radical can be substituted at its carbon atom, as indicated for the imidazolyl-(1) radical $R_4$.

Such a group, wherein $R_8$ represents hydrogen and $R_9$ represents an iminomethyl radical, can for example be converted into an imidazoly-(1) radical by reaction with an appropriate α-halogen-aldehyde or α-halogeno-ketone, such as for example chloracetaldehyde and chlor- and brom-acetone, or a functional oxo derivative thereof.

Functional oxo derivatives are for example those mentioned below, especially acetals, such as acetals with lower alkanols, such as dimethyl-acetal or diethyl-acetal.

This reaction is carried out in the customary manner. Advantageously, a basic condensation agent and/or an excess of the compound of formula X is used. The reaction is suitably carried out at elevated temperature and optionally in an inert gas atmosphere, such as a nitrogen or argon atmosphere.

It is furthermore possible, in a compound of formula XI

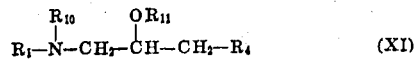

wherein $R_1$ and $R_4$ have the above significance, $R_{10}$ represents $R_2$ or a removable radical and $OR_{11}$ represents $R_3$, or $R_{11}$ represents a removable radical, or $R_{10}$ and $R_{11}$ together represent a removable radical, to remove the removable radical on radicals, with at least one removable radical being present. A removable radical $R_{10}$ or $R_{11}$ is here a monovalent removable radical and a removable radical formed from $R_{10}$ and $R_{11}$ together is a divalent removable radical.

Such removable radicals are especially radicals which can be removed by hydrolysis or hydrogenolysis.

Monovalent radicals which can be removed by hydrolysis are for example acyl radicals, for example oxycarbonyl radicals, such as alkoxycarbonyl radicals, for example the tert.-butoxycarbonyl radical, aralkoxycarbonyl radicals, for example a carbobenzoxy radical, and especially lower alkanoyl radicals or aryloyl radicals, for example the acetyl radical or a benzoyl radical.

Divalent radicals that can be removed by hydrolysis are for example alkylidene radicals, especially lower alkylidene racidals, such as methylene and ethylidene radicals and benzylidene radicals, and also carbonyl and thiocarbonyl radicals.

The hydrolysis is carried out in the customary manner by means of hydrolysing agents and for example in the presence of baisc agents such as, for example, an alkali hydroxide, for example sodium hydroxide or, expecially when using compounds with divalent removable radicals as the starting material, in the presence of acid agents. Such acid agents are, for example, dilute inorganic acids, such as sulphuric acid or a hydrohalic acid, such as one of those mentioned above. Further, a tert.-butoxycarbonyl radical can for example be removed under anhydrous conditions by treatment with a suitable acid, such as trifluoracetic acid.

Radicals that can be removed by hydrogenolysis are, for example, α-arylalkyl radicals, such as benzyl radicals, or aryloxycarbonyl radicals, such as benzyloxycarbonyl radicals, which can be removed in the customary manner by hydrogenolysis, especially by catalytically activated hydrogen, such as by hydrogen in the presence of a hydrogenation catalyst, for example palladium or platinum. Further radicals that be removed by hydrogenolysis are, for example, β-halogen-ethoxycarbonyl radicals, such as the 2,2,2-trichlorethoxycarbonyl radical or the 2-iodethoxy- or 2,2,2-tribromethoxycarbonyl radical, which can be removed in the customary manner, especially by metallic reduction (so-called nascent hydrogen). Nascent hydrogen can here be obtained by the action of metal or metal alloys on agents that yield hydrogen, such as carboxylic acids, alcohols or water, and in particular zinc or zinc alloys together with acetic acid can be used. The hydrogenolysis of β-halogen-ethoxycarbonyl radicals can preferably be effected by chromium-II compounds, such as chromium-II chloride or chromium-II acetate. When carrying out the hydrogenolysis care must be taken that other reducible groups, above all the imidazolyl radical, are not attacked.

Furthermore, it is possible to reduce an azomethine compound corresponding to a compound of formula I, which possesses a non-aromatic C—N double bond, for example a C—N double bond starting from the nitrogen atom that bonds the radicals $R_1$ and $R_2$.

Suitable azomethine compounds are, for example, those of formula XII

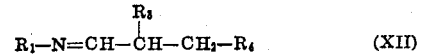

their hydrates of formula $R_1$—N(OH)—$CH_2$—CH($R_3$)—$CH_2$—$R_4$, as well as corresponding quaternary immonium compounds that contain the radical $R_2$ bonded to the quaternary nitrogen atom, with $R_1$, $R_2$, $R_3$ and $R_4$ having above significance.

Suitable azomethine compounds are furthermore, for example, quaternary immonium compounds of formula XIII

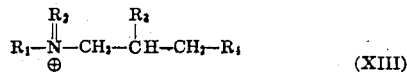
(XIII)

wherein $R_1$, $R_3$ and $R_4$ have the above significance and $R_{2a}H$ is the same as $R_2$.

Such a quaternary immonium compound is furthermore a compound corresponding to formula I, wherein $R_4$ is doubly bonded.

This reduction is performed in the customary manner, for example with a complex metal hydride, such as a di-light metal hydride, such as lithium aluminium hydride or sodium borohydride, or by catalytic hydrogenation, such as with hydrogen in the presence of palladium, platinum oxide or Raney nickel. During the reduction care must be taken that other reducible groups, above all the imidazolyl radical, are not attacked.

It is furthermore possible to reduce the oxo group in a compound of formula XIV

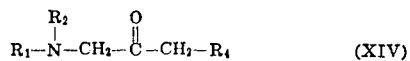
(XIV)

wherein $R_1$, $R_2$ and $R_4$ have the above significance, to a hydroxyl group and optionally to convert the resulting hydroxyl group into a substituted hydroxyl group.

This reduction is carried out in the customary manner, especially using a complex metal hydride, such as one of those mentioned above, or according to the method of Meerwein-Pondorf-Verley or a modification thereof, especially with an alkanol as the reagent and as the solvent, such as isopropanol, and with a metal alkanolate, preferably a metal alkanolate corresponding to the alkanol, such as a metal isopropanolate, for example aluminium isopropanolate. Here care must be taken that other reducible groups, above all the imidazolyl radical, are not attacked.

It is furthermore possible to react a compound of formula XV

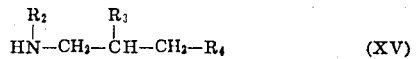
(XV)

wherein $R_2$, $R_3$ and $R_4$ have the above significance, with a compound of formula $R_1$-Hal, wherein $R_1$ has the above significance and Hal represents a halogen atom, especially chlorine or bromine atom.

The reaction is carried out in the customary manner, especially at elevated temperature and preferably under pressure, optionally in the presence of acid-binding agents, such as tertiary amines, for example triethylamine, or with an excess of the compound of formula XV. This procedure is particularly suitable if the compound of formula $R_1$—Hal is activated by meta-directing substituents, for example in the 2-, 4- and/or 6-position of a phenyl radical, expecially by nitro groups.

It is furthermore possible, in a compound of formula I wherein a carbonyl group is present adjacent to a nitrogen atom, to reduce this carbonyl group to a methylene group.

Such compounds (amides) are, for example, those of formula XVI

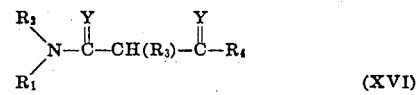
(XVI)

wherein $R_1$, $R_2$, $R_3$ and $R_4$ have the above significance, or $R_2$ possesses an oxo group in the $\alpha$-position, and each of the radicals Y represents two hydrogen atoms or an oxo group, with at least and preferably one oxo group being present.

This reduction takes place in the manner that is customary for amide reductions, for example with a complex metal hydride, such as a di-light metal hydride, especially lithium aluminium hydride, or an alkaline earth metal-aluminium hydride, such as magnesium aluminum hydride, or sodium borohydride in a tertiary amine, such as pyridine or triethylamine, or aluminium hydride itself, or diobrane. If necessary, the reducing agents can also be used conjointly with activators, for example aluminium chloride. The reduction can for example also be carried out electrolytically on cathodes of high overvoltage, such as mercury, lead amalgam or lead cathodes. As the catholyte, a mixture of water, sulphuric acid and a lower alkanecarboxylic acid, such as acetic acid or propionic acid, is for example used. The anodes can consist of platinum, carbon or lead, and sulphuric acid is preferably used as the anolyte. If, in this procedure, $R_3$ is for example an alkoxy radical, then this radical can simultaneously be split reductively to give the free hydroxyl group.

In resulting compounds it is possible to modify, introduce or remove substituents in the customary manner, within the framework of the final substances.

Thus it is possible, in resulting compounds which contain hydroxyl or amino groups, to acylate these. The acylation takes place in the customary manner, for example by reaction with carboxylic acids, advantageously in the form of their reactive functional derivatives, such as acid halides, for example chlorides, esters, especially esters with lower alkanols, such as methanol and ethanol, or cyanomethyl esters, or pure or mixed anhydrides, for example mixed anhydrides with carbonic acid monoalkyl esters, such as carbonic acid monoethyl and isobutyl esters.

In resulting compounds that contain a substituted hydroxyl or amino group, such as an acyloxy group or acylamino group, this group can be split in the customary manner to give the free hydroxyl or amino group respectively, especially by hydrolysis and, where appropriate, using acid or basic catalysts, for example sodium hydroxide solution, or also by reduction, for example with a complex metal hydride, as described above. If this splitting of a functionally modified hydroxyl group, especially of an acyloxy group, should already occur in the course of one of the above manufacturing methods, a resulting free hydroxyl group can optionally be acylated as described above. The same is true of an acylamino group.

In resulting compounds that possess at least one hydrogen atom on an amino group, this group can be substituted.

The substitution takes place for example by reaction with a reactive ester of an appropriate alcohol or by means of an epoxide. Reactive esters are especially those mentioned above. The reaction takes place in the customary manner, advantageously in the presence of a basic condensation agent.

The substitution of the abovementioned amino groups can however also take place by reduction, for example by reaction with an appropriate oxo compound, such as an appropriate aldehyde or ketone, and subsequent or simultaneous reduction of the condensation product thus obtained. The reduction takes place in the customary manner, for example with hydrogen in the presence of a catalyst, such as a platinum, palladium or nickel catalyst, or also with formic acid. An azomethine compound, for example of formula XI, obtained as the condensation product, can however also be reduced by means of a complex metal hydride as described above.

Another possibility for the substitution of primary or secondary amino groups for example consists of carrying out a reaction with an acylating agent and reducing the carbonyl group in the resulting acylamino compound to the methylene group in the customary manner, for example by means of an amide reducing agent, for example one of those mentioned above. Possible acylating agents are carboxylic acids, for example aliphatic, araliphatic or cycloaliphatic carboxylic acids, preferably in the form of their functional derivatives, such as halides, especially chlorides, or anhydrides, for example pure or mixed anhydrides, or internal anhydrides, such as ketenes.

In resulting compounds that contain a halogen atom, for example chlorine or bromine, on an aromatic ring, this atom can be replaced by hydrogen. This is done in the customary manner, for example by dehalogenating hydrogenation, such as hydrogenation in the presence of nickel or palladium catalysts.

In resulting compounds that contain aryl radicals that can be nitrated, it is possible to nitrate these. The nitration is carried out by known methods, for example by treatment with a mixture of concentrated sulphuric acid and concentrated nitric acid or with the mixed anhydride of nitric acid and a carboxylic acid, for example a lower alkanecarboxylic acid, such as acetic acid.

In resulting compounds that contain nitroaryl radicals, these radicals can be reduced to aminoaryl radicals in the customary manner, for example with iron and hydrochloric acid or by means of catalytically activated hydrogen, such as hydrogen in the presence of a hydrogenation catalyst, for example a platinum, nickel or palladium catalyst, such as platinum oxide, Randy nickel or palladium on charcoal.

The subsequent conversions can be carried out individually or in combination, and in optional sequence. Care must be taken in the individual operations, especially in reductions, that other functional groups are not attacked.

The invention also relates to those embodiments of the process in which the process is stopped at any stage or in which a start is made from a compound obtainable as an intermediate produce at any stage and the missing process stages are carried out, or a starting substance is formed under the reaction conditions or, where relevant, a starting substance is used in the form of a salt and/or racemate or optical antipode.

Thus it is for example possible to react a compound of formula $O=CH-CH(R_3)-CH_2-R_4$, wherein $R_3$ and $R_4$ have the above significance, with an amine of formula $R_1-NH-R_2$, wherein $R_1$ and $R_2$ have the above significance, in the presence of a suitable reducing agent, such as one of those mentioned above. Here a compound of formula XII or its quaternary immonium compound is obtained as an intermediate product, and this is then reduced in accordance with the invention.

The reactions mentioned are carried out in the customary manner, in the presence or absence of diluents, condensation agents and/or catalytic agents, at lowered, ordinary or elevated temperature, optionally in a closed vessel.

Depending on the process conditions and starting substances, the final substances are obtained in the free form or in the form of their acid additional salts, which is also included in the invention. Thus it is for example possible to obtain basic, neutral or mixed salts, and where appropriate also hemihydrates, monohydrates, sesquihydrates or polyhydrates thereof. The acid addition salts of the new compounds can be converted into the free compound in known manner, or ion exchangers. On the other hand the resulting free bases can form salts with organic or inorganic acids. In particular, such acids are used for the manufacture of acid addition salts as are suitable for the formation of therapeutically useful salts. As such acids there may for example be mentioned: hydrohalic acids, sulphuric acids, phosphoric acids, nitric acid, perchloric acid, aliphatic, alicyclic, aromatic or heterocyclic carboxylic or sulphonic acids, such as formic, acetic, propionic, succinic, glycollic, lactic, malic, tartaric, citric, ascorbic, maleic, hydroxy-maleic or pyruvic acid; phenylacetic, benzoic, p-amino-benzoic, anthranilic, p-hydroxybenzoic, salicylic or p-amino-salicylic acid, embonic acid, methanesulphonic, ethane-sulphonic, hydroxyethanesulphonic and ethylenesulphonic acid; halogenobenzenesulphonic, toluenesulphonic and naphthalene-sulphonic acids or sulphanilic acid; methionine, tryptophan, lysine or arginine.

These and other salts of the new compounds, such as for example the picrates, can also serve for the purification of the resulting free bases, by converting the free bases into salts, separating these off and again liberating the bases from the salts. Because of the close relationships between the new compounds in the free form and in the form of their salts, what has been said above and hereinafter with reference to the free compounds refers similarly also to the corresponding salts wherever this applies.

Depending on the number of the asymmetric C atoms and the choice of the setting substances and methods of working, the new compounds may be in the form of racemate mixtures, racemates or optical antipodes.

Racemate mixtures can be separated in a known manner, into the pure racemates on the basis of the physico-chemical differences of the constituents for example by chromatography and/or fractional crystallisation.

Pure racemates can be resolved according to known methods, for example by recrystallisation from an optically active solvent, with the aid of micro-organisms, or by reaction with an optically active acid that forms salts with the racemic compound and separation of the salts obtained in this manner, for example on the basis of their different solubilities, into the diastereomers from which the antipodes can be liberated by the action of suitable agents. Particularly customary optical active acids are, for example, the D- and L-forms of tartaric acid, di-o-toluyltartaric acid, malic acid, mandelic acid, camphorsulphonic acid or quinic acid. Advantageously, the more active of the two antipodes is isolated.

According to the invention, it is however also possible to obtain the final products in the form of the pure racemates or optical antipodes by employing starting substances containing one or more asymmetric C atoms in the form of the pure racemates or of the optical antipodes.

In order to carry out the reactions according to the invention, it is advantageous to use those starting substances that lead to the final products that were particularly highlighted at the outset.

The starting substances are known or, if new, they can be obtained according to know methods. Thus, new starting substances are also a feature of the invention. Preferably, those starting substances are used and manufactured that lead to the final substances highlighted above.

Thus it is possible to obtain compounds of formula XI, wherein $R_{10}$ and $R_{11}$ together represent a divalent removable radical, that is to say for example compounds of formula XVII

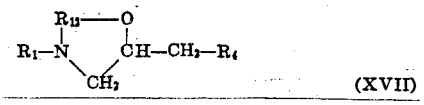

(XVII)

wherein $R_1$ and $R_4$ have the above significance and $R_{12}$ represents an alkylidene radical, especially a lower alkylidene radical, such as an ethylidene radical or especially the methylene radical, or an aryl-substituted lower alkylidene radical, such as especially the benzylidene radical, above all the 2,3-diphenyl-5-[imidazolyl-(1)-methyl]-oxazolidine if a compound of formula XVIII

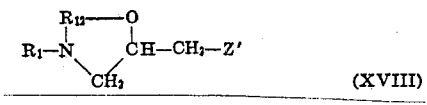

(XVIII)

wherein $R_1$ and $R_{12}$ have the above significance and $Z'$ represents a reactive esterified hydroxyl group, is reacted with an imidazole corresponding to the above radical $R_4$, which possesses a hydrogen atom in the 1-position.

The reaction is carried out as described above for compounds of formula V, with the significance of $Z'$ corresponding to that of the radical Z.

It is furthermore possible to obtain compounds of formula XVII if compounds of formula I, wherein $R_2$ represents hydrogen and $R_3$ represents a free hydroxyl group, is reacted with an aldehyde or ketone of formula $R_{12}=O$, wherein $R_{12}$ has the above significance, or with a reactive carbonyl derivative thereof.

Reactive carbonyl derivatives are above all acetals, ketals, hemithioketals, thioketals, especially dimethyl- or diethyl-acetals, -ketals or -thioketals, or acylals, especially those with acetic acid or with a hydrohalic acid, for example compounds of formulae $R_{12}Cl_2$ or $R_{12}Br_2$, wherein $R_{12}$ has the above significance.

This reaction is carried out in the customary manner, in the presence or absence of a solvent, at room temperature or preferably at elevated temperature, if required in the presence of a condensation agent, especially an acid condensation agent.

Compounds of formula X, wherein $R_8$ represents hydrogen and $R_9$ represents an iminomethyl radical, can for example be obtained if an amine of formula XIX

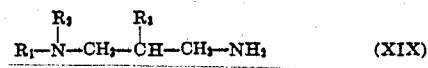

(XIX)

wherein $R_1$, $R_2$ and $R_3$ have the above significance, is reacted with hydrogen cyanide or with a nitrile of a lower alkanecarboxylic acid, such as acetonitrile, according to methods which are in themselves known. Starting compounds are thereby obtained that are unsubstituted or loweralkylated on the C atom of the iminomethyl radical.

Appropriate starting compounds that carry an amino group on the C atom of the iminomethyl radical are for example obtained if an epoxide of formula

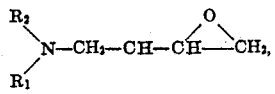

corresponding to compounds XIX, is reacted in known manner with a guanidine, or a salt thereof, for example guanidine carbonate.

These reactions are advantageously carried out in the presence of suitable condensation agents, especially basic condensation agents, and at elevated temperature.

In resulting compounds of formula XVII, substituents can be introduced, modified or removed within the framework of the definition of these substances, especially as described above. Equally, resulting racemate mixtures can be separated as described above.

The new, pharmacologically active compounds can for example be used in the form of pharmaceutical preparations in which they are present in the free form or optionally in the form of their salts, especially the physiologically tolerable salts, in admixture or conjunction with a pharmaceutical, organic or inorganic, solid or liquid excipient that is suitable, for example, for enteral or parenteral administration. Suitable substances for forming the excipient are those that do not react with the new compounds, such as for example water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations can be, for example, in the form of tablets, dragees, capsules or suppositories, or in a liquid form as solutions (for example, as an elixir or syrup), suspensions or emulsions. They are optionally sterilised and/or contain auxiliary substances, such as preservatives, stabilisers, wetting agents or emulsifiers, solubilising agents or salts for regulating the osmotic pressure, or buffers. They can also contain other therapeutically valuable substances. The pharmaceutical preparations are formulated according to customary methods. The dosage of the new compounds can vary depending on the compound and on the individual requirements of the patient.

The invention is described in more detail in the examples which follow.

EXAMPLE 1

36.4 G of 1-(N-ethyl-anilino)-2,3-epoxy-propane and 13.8 g of imidazole in 200 ml of absolute ethanol are heated to the boil for 4 hours under reflux, whilst stirring. After removing the solvent under reduced pressure, 53.1 g of a yellow oil are left and this is rectified by vacuum distillation. In the course of this, 28 g of a colourless oil pass over. After triturating with a benzene/petroleum ether mixture at 5 C, 1-(N-ethylanilino)-2-hydroxy-3-(1-imidazolyl)-propane of formula

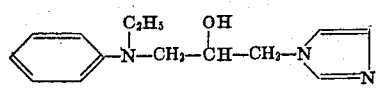

is obtained as colourless powder which, after recrystallisation from benzene/petroleum ether, 4:1, melts at 95 –96 C.

The 1-(N-ethyl-anilino)-2,3-epoxy-propane used as the starting material can be obtained as follows:

90 G of epichlorhydrin are added dropwise over the course of 30 minutes, whilst stirring, to a solution of 96.8 g of N-ethylaniline in 120 ml of glacial acetic acid and 80 ml of water at 20 C. The reaction mixture is thereafter stirred for 18 hours at 20 C. After removing the solvent, initially at 60 C/12 mm Hg and then at 75 –80 C/0.02 mm Hg, the residue is dissolved in 50 ml of benzene. 120 ml of 44 percent strength sodium hydroxide solution are added dropwise to the solution at 20 –25 C, whilst stirring. The reaction mixture is stirred for 3 hours at 25 C and 18 hours at 0 –5 C and 150 ml of water are then added. The organic phase is separated off and dried over potassium hydroxide. After removing the benzene at 12 mm Hg, the residue is rectified in a high vacuum, whereby 100 g of 1-(N-ethyl-anilino)-2,3-epoxy-propane are obtained.

EXAMPLE 2

14.3 G of 1-(N-methyl-o-methoxy-anilino)-2,3-epoxy-propane and 5.1 g of imidazole in 120 ml of absolute ethanol are heated to the boil for 18 hours under reflux, whilst stirring. After evaporating off the solvent under reduced pressure, 22 g of a yellow syrupy liquid remain. This is first purified by column chromatography on silica gel, 0.05–0.2 mm, as the absorbent, using acetone as the eluting agent. After the subsequent high vacuum distillation of the main fraction of the elute, 1-(N-methyl-o-methoxy-anilino)-2-hydroxy-3-(1-imidazolyl)-propane of formula

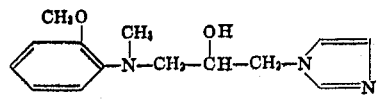

is obtained analytically pure, as a colourless oil.

The 1-(N-methyl-o-methoxy-anilino)-2,3-epoxypropane used as the starting material can be obtained as follows:

41 G of epichlorhydrin are added dropwise at 25 C over the course of 30 minutes, whilst stirring, to a solution of 55 g of N-methyl-o-anisidine in 60 ml of glacial acetic acid and 40 ml of water. The reaction mixture is stirred for 18 hours at 20 C. The solvent is thereafter removed at 80 C/12 mm Hg, the residue is dissolved in 60 ml of benzene and 60 ml of 40 percent strength sodium hydroxide solution are added dropwise. After 3 hours' stirring at 20 C, 150 ml of water are added, the organic phase is separated off and dried over potassium hydroxide, the solvent is evaporated off under reduced pressure. 62 g of a dark oil remain and are rectified under a high vacuum. In the course of this 35 g of 1-(N-methyl-o-methoxy-anilino)-2,3-epoxy-propane pass over as a colourless liquid.

EXAMPLE 3

24 G of 1-(N-methyl-p-chloranilino)-2,3-epoxypropane in 200 ml of ethanol are stirred under reflux for 18 hours with 7.4 g of imidazol in 50 ml of absolute ethanol. The solvent is afterwards evaporated under reduced pressure, the residual yellow syrup (32 g) dissolved in 2N hydrochloric acid and stirred for 18 hours at room temperature with chloroform. The substances extracted with chloroform (1.8 g) are discarded. The hydrochloric acid solution is rendered alkaline with 10 N sodium hydroxide solution and extracted twice on each occasion with ether and then with chloroform. The ethereal extracts are dried and concentrated by evaporation, having 11 g of 1-(N-methyl-p-chloranilino)-2-hydroxy-3-(1-imidazolyl)-propane of the formula

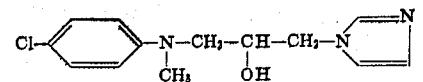

in the form of a yellow oil that crystallises on standing. It can be obtained in analytically pure form by recrystallisation twice from ethyl acetate (m.p. 131 –132 C; yield 7 g). From the dried chloroform extracts is obtained a dark, oily product (16 g) that is not found to be pure according to thin layer chromatography and from which further analytically pure substance can be obtained by extraction with ethyl acetate and recrystallisation from the same solvent.

7.3 G of the pure base are dissolved hot in a little ethanol and treated with one equivalent HCl in ethanol. Isopropylether is added to the hot solution until a recurring turbidity is just on the point of disappearing again. After intensive trituration, 7 g of colourless monohydrochloride, that is readily soluble in water, form as crystals (m.p. 175 –177 C).

The 1-(N-methyl-p-chloranilino)-2,3-epoxypropane used as starting material is obtained from N-methyl-p-chloraniline and epichlorhydrine in the manner described in Example 1.

EXAMPLE 4

40 G of N-glycidylindolin in 200 ml of absolute ethanol and 13.6 g of imidazole in 100 ml of absolute ethanol are heated to the boil for 15 hours under reflux while stirring. The solvent is then evaporated. The residual sirupy oil (54 g) is dissolved in 2N hydrochloric acid and stirred with chloroform for 18 hours at room temperature. The substances contained in the chloroform extract are discarded. The hydrochloric acid solution is rendered alkaline with 10N sodium hydroxide solution and extracted twice on each occasion with ether and then with chloroform. The ethereal extracts are dried and concentrated by evaporation, leaving 8 g of 1-(indolin-1-yl)-2-hydroxy-3-(1-imidazolyl)-propane of the formula

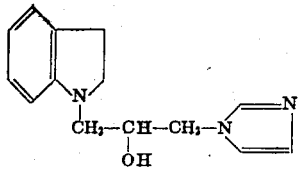

in the form of an oil, which crystallises on being left to stand. 4.8 G of analytically pure substance (m.p. 101°–104°C) are obtained by repeated recrystallization from ethyl acetate. The chloroform extracts yield, after drying and concentration by evaporation, 44 g of a darkly coloured oil, which is extracted for 4 hours with ethyl acetate. After the solvent has been evaporated there again remains an oil (16 g) that becomes crystalline by repeated heating with ethyl acetate. By repeated recrystallisation from the same solvent, 7.5 g of analytically pure substance of the above formula are obtained (m.p. 100°–103°C).

14.5 G of the pure base are dissolved that with one equivalent HCl in ethanol. Azo crystalline salt is obtained on the addition of isopropylether or on cooling. The solution is concentrated by evaporation and the residual syrupy oil is firstly triturated with hot ethyl acetate three times, then the solvent is evaporated. In this way the mono-hydrochloride can be obtained in crystalline from and, by washing with ethyl acetate, analytically pure (m.p. 119°–122°C; pale green crystals that are readily soluble in water; yield 13.5 g).

The N-glycidylindolin used as starting material is obtained from indolin and epichlorohydrin in the same way as described in Example 1.

EXAMPLE 5

36 G of N-glycidyl-1,2,3,4-tetrahydroquinoline in 150 ml of absolute ethanol and 16 g of imidazole in 100 ml of absolute ethanol are stirred for 18 hours under reflux. The solvent is then distilled off under reduced pressure. The residual dark syrup (52 g) is dissolved in 2N hydrochloric acid and stirred with chloroform for 18 hours at room temperature. The substances contained in the chloroform are discarded (2.2 g). The hydrochloric acid solution is rendered alkaline with 10N sodium hydroxide solution and initially extracted twice with ether, then twice with chloroform. After the dried chloroform extracts have been concentrated by evaporation, there remain 28 g of an oil, which is extracted three times with 500 ml of ether each time during the course of 30 minutes, whilst stirring. The undissolved residue (12 g at the finish of this procedure) is decanted and discarded. From the ethereal extracts is obtained a yellow oil, from which 10 g of crude 1-(1,2,3,4-tetrahydroquinolin-1-yl)-2-hydroxy-3-(1-imidazolyl)-propane of the formula

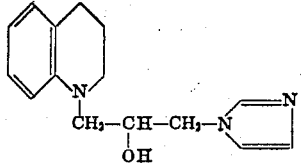

precipitates after a short time. After drying and concentration by evaporation, the ethereal extracts yield 15 g of a sirupy oil, which, dissolved in 150 ml of 2N hydrochloric acid, is extracted in an extraction apparatus for 48 hours with 400 ml of chloroform. The CHCl₃ phase contains 2 g of a dark oil, which is rejected. The hydrochloric solution is rendered alkaline with 10N sodium hydroxide solution and extracted with chloroform. After the solvent has been dried and evaporated, there remain 12 g of a yellow oil, which is extracted with ether twice (30 minutes each time). The undissolved residue (0.5 g) is rejected. From the ethereal extracts is obtained a yellow oil, from which the compound of the above formula crystallises after a short time (9 g). Both crude substances (10 + 9 g) are together recrystallised from 150 ml of ethyl acetate, when 12.3 g of analytically pure product of the above formula is obtained (m.p. 108°–109°C).

10.5 G of the pure base are suspended in a small amount of hot ethanol. One equivalent HCl in ethanol is added, the mixture is then concentrated by evaporation and the residual sirupy mono-hydrochloride crystallised with ethyl acetate as described in Example 4. 10 G of analytically pure mono-hydrochloride are finally obtained in the form of reddish crystals (m.p. 112°–116°C).

The N-glycidyl-1,2,3,4-tetrahydroquinoline is obtained from 1,2,3,4-tetrahydroquinoline and epichlorohydrin in the manner as described in Example 4.

EXAMPLE 6

7.5 G of N-glycidyl-1,2,3,5-tetrahydro-4,1-benzoxazepine and 2.8 g of imidazole are dissolved in 80 ml of absolute ethanol and heated to the boil for 15 hours while stirring. After the solvent has been evaporated, the residual, dark yellow syrup (10.5 g) is dissolved in 2N hydrochloric acid and stirred with chloroform for 18 hours at room temperature. The substances contained in the chloroform are rejected (0.7 g). The hydrochloric acid solution is rendered alkaline with 10N sodium hydroxide solution and initially extracted twice with ether (30 minutes on each occasion), then twice with chloroform. The dried ethereal extracts are concentrated by evaporation, leaving 2.5 g of a light yellow oil that is dissolved in a small amount of ethyl acetate. On cooling, 1 g of 1-(1,2,3,5-tetrahydro-4,1-benzoxazepin-1-yl)-2-hydroxy-3-(1-imidazolyl)-propane of the formula

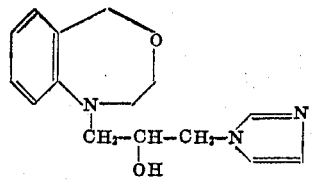

crystallises, which can be obtained in analytically pure form by repeated recrystallisation from ethyl acetate (m.p. 102°–104°C).

The chloroform extracts yield, after drying and concentration by evaporation, 8.5 g of an oily product that is not found to be pure according to thin layer chromatography and which is extracted three times with 500 ml of ether on each occasion under reflux (4hours).

The undissolved residue (2.5 g) is discarded. The three ethereal extracts contain a light yellow oil, which crystallises to yield 4.4 g of crude substance of the above formula. The crude product is dissolved in a small amount of hot ethyl acetate. After cooling, 3.2 g of analytically pure substance are obtained in the form of crystals (m.p. 102°–104°C).

4 G of pure base are suspended in a small amount of hot ethanol. One equivalent HCl in ethanol is added and the mixture heated further. In the process, isopropylether is added until a recurring turbidity is just on the point of disappearing again. After lengthy trituration, 4 g of the mono-hydrochloride that is readily soluble in water forms as crystals (m.p. 131°–133°C).

The N-glycidyl-1,2,3,5-tetrahydro-4,1-benzoxazepine used as starting material is obtained as follows:

16.5 G of 1,2,3,5-tetrahydro-4,1-benzoxazepine are dissolved in 150 ml of epichlorohydrin and stirred for 15 hours under reflux. The excess epichlorohydrin is distilled off under reduced pressure, the residue dissolved in 100 ml of benzene and the solution stirred for 6 hours at 50°C with 12 ml of 10N sodium hydroxide solution. After the NaCl that forms has been throughly washed with water, the benzene phase is dried, concentrated by evaporation, and the residual 21 g of yellow oil purified by column chromatography (1,000 g of silica gel 0.05 –0.2 mm, eluant: chloroform/methanol 9:1). 9.1 G of analytically pure N-glycidyl-1,2,3,5-tetrahydro-4,1-benzoxazepine are obtained.

EXAMPLE 7

In accordance with the process of Example 1, 1-(p-anisidino)-2-hydroxy-3-(1-imidazolyl)-propane of the formula

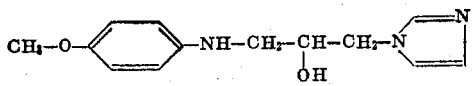

is obtained, which is recrystallised from ethyl acetate to yield an analytically pure substance (m.p. 125°–126°C).

8.5 G of the pure base are dissolved in ethanol, the solution is heated and exactly 1 equivalent HCl in ethanol is added. Isopropylether is added until a recurring turbidity is just on the point of disappearing again. On trituration, 8.6 g of mono-hydrocholoride that is colourless to light grey in colour and readily soluble in water, forms as crystals (m.p. 118°–121°C).

EXAMPLE 8

1 G of sodium hydride and 1.4 g of imidazole are stirred for 1 hour under reflux in 50 ml of absolute toluene. Afterwards, a solution of 4.3 g of N-methyl-N-(2,3-epoxypropyl)-α-naphthylamine in 20 ml of absolute toluene is added dropwise and the reaction mixture boiled under reflux, while stirring, for 18 hours. The reaction mixture is left to stand for 3 days and the excess sodium hydride then reacted with ethanol, in the process of which it is annulled. The reaction mixture is subsequently concentrated by evaporation under reduced pressure and the residue treated with water and chloroform. The chloroform extract contains 2.9 g of the desired 1-(N-methyl-α-naphthylamino)-2-hydroxy-3-(1-imidazolyl)-propane of the formula

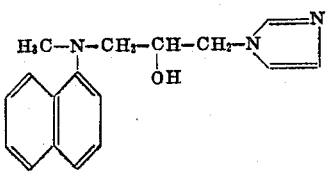

which has an oily consistency. The oily product is rendered crystalline by dissolving it hot in ethyl acetate and treating it with ether until turbidity occurs. After a further recrystallisation, analytically pure, slightly coloured crystals are obtained (m.p. 142°–144°C).

EXAMPLE 9

10 G of 1-(N-methyl-α-npahthylamino)-2-hydroxy-3-(1-imidazolyl)-propane, 100 g of acetic acid anhydride and 100 g of pyridine are heated for 18 hours to 60°C. The excess acetic acid anhydride pyridine is distilled off under reduced pressure and the residual oily 1-(N-methyl-α-naphthylamino)-2-acetosy-3-(1-imidazolyl)-propane is purified by column chromatography. The analytically pure product has the formula

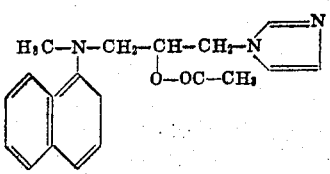

The obtained slightly coloured oil is identified in form of its picrate (m.p. 103°–105°).

EXAMPLE 10

Tablets containing 50 mg of active substance are manufactured in the customary manner:

| Composition | Mg. |
|---|---|
| 1-(N-ethyl-anilino)-2-hydroxy-3-(1-imidazolyl)-propane | 50 |
| Wheat starch | 59 |
| Lactose | 70 |
| Colloidal silica | 10 |
| Talc | 10 |
| Magnesium stearate | 1 |
| Total | 200 |

The 1-(N-ethyl-anilino)-2-hydroxy-3-(1-imidazolyl)-propane is mixed with a part of the wheat starch, with lactose and with colloidal silica and the mixture is forced through a sieve. A further part of the wheat starch is glutinised with a five-fold amount of water on a waterbath and the powder mixture is kneaded with this gluten until a weakly plastic mass has been produced.

The plastic mass is pressed through a sieve of about 3 mm mesh width, dried, and the dry granules again forced through a sieve. Thereafter the remaining wheat starch, talc and magnesium stearate are admixed and the mixture is pressed into tablest with a breaking groove weighing 200 mg.

We claim:
1. A compound of formula I

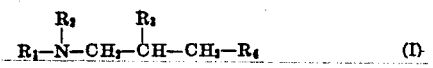 (I)

wherein $R_1$ is phenyl, phenyl substituted by lower alkyl, lower alkoxy, halogen or trifluoromethyl, naphthyl or naphthyl substituted by lower alkyl, lower alkoxy, halogen or trifluoromethyl, $R_2$ is hydrogen or lower alkly, $R_3$ is hydrogen, lower alknaoyloxy or benzoyloxy and $R_4$ is 1-imidazolyl, or a therapeutically acceptable acid addition salt thereof.

2. The compound as defined in claim 1, wherein said compound is 1-(N-methyl-o-methoxy-anilino)-2-hydroxy-3-(1-imidazolyl)-propane.

3. The compound as defined in claim 1, wherein said compound is 1-(N-methyl-p-Chloranilino)-2-hydroxy-3-(1-imidazolyl)-propane.

4. The compound as defined in claim 1, wherein said compound is 1-(p-anisidino)-2-hydroxy-3-(1-imidazolyl)-propane.

5. The compound as defined in claim 1, wherein said compound is 1-(1-naphthyl-N-methylamino)-2-hydroxy-3-1-imidazolyl)-propane.

6. The compound as defined in claim 1, wherein said compound is 1-(N-methyl-1-naphthylamino)-2-acetoxy-3-1-imidazolyl)-propane.

* * * * *

PO-1050
(5/69)

UNITED STATES PATENT OFFICE
CERTIFICATE OF CORRECTION

Patent No. 3,821,241                Dated June 28, 1974

Inventor(s) Paul Schmidt et al

It is certified that error appears in the above-identified patent and that said Letters Patent are hereby corrected as shown below:

Column 19, line 9, delete "alkly" and substitute --- alkyl ---;
line 10, delete "alknaoyloxy" and substitute --- alkanoyloxy ---.

Column 20, line 9, after "hydroxy-3-" insert --- ( ---;
line 12, after "acetoxy-3-" insert --- ( ---.

Signed and sealed this 29th day of October 1974.

(SEAL)
Attest:

McCOY M. GIBSON JR.
Attesting Officer

C. MARSHALL DANN
Commissioner of Patents